United States Patent
Manicone (10) Patent No.: US 7,561,854 B2
(45) Date of Patent: Jul. 14, 2009

(54) LOSSLESS TRANSMIT PATH ANTENNA SWITCH CIRCUIT

(75) Inventor: Anthony C. Manicone, Rochester, NY (US)

(73) Assignee: Harris Corporation, Melbourne, FL (US)

(*) Notice: Subject to any disclaimer, the term of this patent is extended or adjusted under 35 U.S.C. 154(b) by 430 days.

(21) Appl. No.: 11/565,819

(22) Filed: Dec. 1, 2006

(65) Prior Publication Data

US 2008/0132180 A1 Jun. 5, 2008

(51) Int. Cl.
*H04B 1/44* (2006.01)

(52) U.S. Cl. .............. 455/83; 455/127.1; 455/269

(58) Field of Classification Search ........... 455/83, 455/550.1, 560, 562.1, 269, 341, 414.1, 78, 455/115.1, 127.1
See application file for complete search history.

(56) References Cited

U.S. PATENT DOCUMENTS 5,361,403 A * 11/1994 Dent .................. 455/74
5,423,074 A * 6/1995 Dent .................. 455/74
5,446,464 A 8/1995 Feldle et al.
2003/0078037 A1 * 4/2003 Auckland et al. ........ 455/422
2003/0220081 A1 11/2003 Dykstra et al.

FOREIGN PATENT DOCUMENTS

JP 59 070323 4/1984

* cited by examiner

*Primary Examiner*—Tony T Nguyen
*Assistant Examiner*—Thuan T Nguyen
(74) *Attorney, Agent, or Firm*—Darby & Darby PC; Robert J. Sacco (57) ABSTRACT

A system (200) for lossless transmit path antenna switching in a transceiver using quadrature combined power amplifiers is provided. The system is comprised of a quadrature (90°) hybrid power combiner (218) having a first and a second input port (260, 264), an isolated port (266), and an output port (262). The system is also comprised of a first and second RF power amplifier circuit (212, 214). The RF power amplifier circuits are respectively coupled to the first and second input ports. The RF power amplifier circuits have an output impedance that is selectively variable between a first state and a second state. The quadrature hybrid power combiner communicates RF energy from the first and second input ports to the output port when each RF power amplifier circuit is in its first state. The quadrature hybrid power combiner communicates RF energy from the output port to the isolated port when each RF amplifier circuit is in its second state.

23 Claims, 4 Drawing Sheets

FIG. 4

LOSSLESS TRANSMIT PATH ANTENNA SWITCH CIRCUIT

BACKGROUND OF THE INVENTION

1. Statement of the Technical Field

The inventive arrangements relate to transceivers. More particularly, the inventive arrangements relate to a switch circuit for connecting a transmitter or a receiver to an antenna.

2. Description of the Related Art

Conventional RF power amplifiers commonly make use of one or more RF power dividers and combiners. These RF dividers and combiners are conventionally used to distribute RF power to a plurality of RF power amplifier circuits for amplifying an RF signal. The output RF signals from the plurality of RF power amplifier circuits are subsequently combined in one or more combiner circuits to form a single high power RF output. A quadrature (90°) hybrid coupler is commonly used to implement an RF power divider. The same type of quadrature (90°) hybrid coupler can also be used to implement an RF power combiner.

Figure 1:
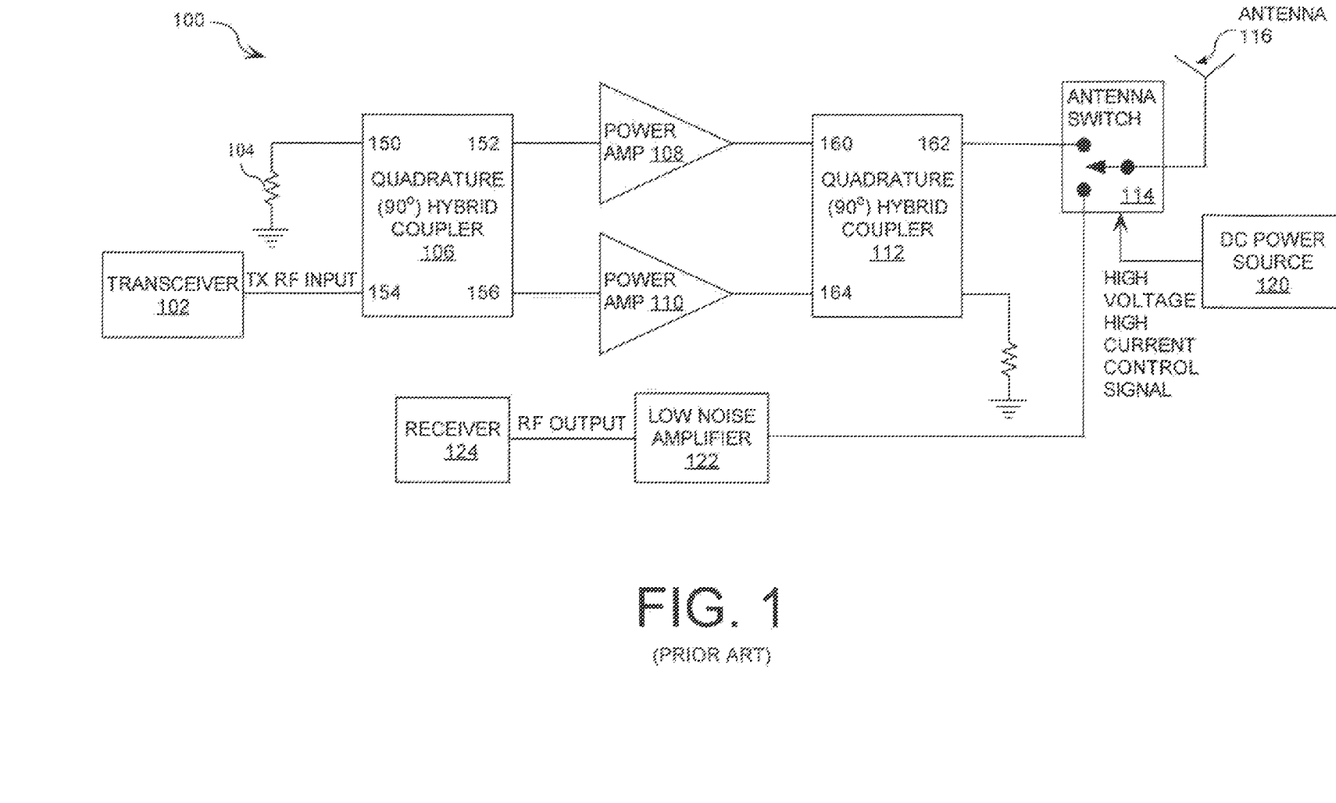
FIG. 1 is a block diagram of a conventional transceiver circuit.

A conventional transceiver circuit 100 including the above listed components is shown in FIG. 1. With regard to FIG. 1, a first quadrature (90°) hybrid coupler 106 is provided with an input port 154, an isolated port 150, and output ports 152, 156. The input port 154 is coupled to a transmitter 102. The isolated port 150 is coupled to ground through a resistive termination 104 (for example, a fifty ohm resistor). Each output port 152, 156 provides an output RF power that is reduced by half relative to the RF power at the input port 154. However, the RF signal provided at output port 152 is 90° out of phase relative to the RF signal at output port 156. Quadrature hybrid couplers of this type are well known in the art. The output port 152 is coupled to a first power amplifier 108. Likewise, the output port 156 is coupled to a second power amplifier 110.

The transmitter 102 can communicate a radio frequency (RF) signal to the first quadrature (90°) hybrid coupler 106. Subsequently, the quadrature (90°) hybrid coupler 106 communicates a first output RF signal to the first power amplifier 108 and a second output RF signal to the second power amplifier 110. Each power amplifier 108, 110 performs actions to amplify the received RF signal's power by a certain amount. Thereafter, these power amplifiers 108, 110 communicate the amplified RF signals to input ports 160, 164 of a second quadrature (90°) hybrid coupler 112. This second quadrature (90°) hybrid coupler 112 is implemented in a reverse arrangement within the transceiver circuit 100 as compared to the first quadrature (90°) hybrid coupler 106. In effect, the second quadrature (90°) hybrid coupler 112 acts as a combiner, i.e., combines the amplified RF signals. However, those skilled in the art will appreciate that signals received at input port 160 will be phase shifted by 90° relative to signals received at input port 164. In effect, the phase shift at ports 160, 164 is opposite the phase shift at ports 152, 156 so that the net result is that the signals received at ports 160 and 164 are combined in phase at the output port 162. After combining the two amplified RF signals, the quadrature (90°) hybrid coupler 112 communicates the resulting RF signal along an electrical path to the antenna 116. This electrical path is typically comprised of an antenna switch 114. For example, the antenna switch 114 can be implemented using PIN diodes. The PIN diodes in the antenna switch 114 are controlled by a high voltage/high current control signal provided by a DC power source 120. In a transmit mode, the antenna switch 114 creates a low loss path between an output port 162 of the second quadrature (90°) hybrid coupler 112 and the antenna 116.

In receive mode, the antenna switch 114 disconnects the quadrature (90°) hybrid coupler 112 from the antenna 116 and instead creates a low loss path between the antenna 116 and a low noise amplifier 122. Consequently, a received radio frequency (RF) signal is communicated from the antenna 116 to the low noise amplifier 122 through the antenna switch 114. The low noise amplifier 122 performs actions to amplify a received RF signal's power. Subsequently, the low noise amplifier 122 communicates the amplified RF signal to a receiver 124.

Despite the advantages of this conventional transceiver circuit 100, it suffers from certain drawbacks. For example, the antenna switch 114 can introduce significant amounts of loss into the transmit path. This loss requires the power amplifiers 108, 110 to produce additional RF power output in order to achieve desired RF power output at the antenna 116. In turn, the additional RF power required from the RF power amplifiers 108, 110 requires more power from an external power supply (not shown). Consequently, the overall efficiency of transceiver circuit 100 is reduced. In addition, the antenna switch 114 is often comprised of a PIN diode RF switch designed for handling substantial levels of RF power. Such an antenna switch 114 often requires hundreds of volts to operate. Notably current power supplies that are suitable to provide such a voltage to the antenna switch 114 are difficult to incorporate into portable equipment.

In view of the foregoing, there remains a need for a transceiver circuit having an antenna switch circuit that can minimize the amount of power loss experienced by a transmitted RF signal. There also remains a need for a transceiver circuit having an antenna switch circuit that requires a lower voltage to operate.

SUMMARY OF THE INVENTION

The invention concerns a system for lossless transmit path antenna switching in a transceiver using quadrature combined power amplifiers. The system is comprised of a quadrature hybrid power combiner having a first input port, a second input port, an isolated port, and an output port. The system is also comprised of a first RF power amplifier circuit and second RF power amplifier circuit. The first and second RF power amplifier circuits are respectively coupled to the first input port and the second input port.

The first and second RF power amplifier circuits each have an output impedance that is selectively variable between a first state and a second state. The quadrature hybrid power combiner communicates RF energy from the first and second input ports to the output port when the first and second RF power amplifier circuits are each in the first state. The quadrature hybrid power combiner communicates RF energy from the output port to the isolated port when the first and second RF amplifier circuits are in the second state. According to one aspect of the invention, the output impedance of the first and second RF power amplifier circuits are substantially matched to the first and second input ports in the first state. The output impedance of the first and second RF power amplifier circuits are substantially mismatched to the first and second input ports in the second state.

According to an aspect of the invention, the system is also comprised of an antenna. The output port of the quadrature hybrid power combiner is coupled to the antenna. Advantageously, the output port of the quadrature hybrid power combiner can be coupled to the antenna exclusive of any RF switching.

According to another aspect of the invention, the system is comprised of a control circuit. The control circuit is coupled to the first and second RF power amplifier circuits. The control circuit is provided for selectively transitioning the first and second RF power amplifier circuits between the first state and the second state responsive to a control signal.

According to another aspect of the invention, the system is also comprised of an RF switch. The RF switch has an input terminal coupled to the isolated port of the quadrature hybrid power combiner. The RF switch is configured for selectively coupling the input terminal to either a first output terminal of the RF switch or a second output terminal of the RF switch. The first output terminal of the RF switch is connected to a resistive termination, such as fifty ohm (50Ω) resistor.

According to another aspect of the invention, the RF switch is responsive to the control circuit. The RF switch is configured for coupling the input terminal to the first output terminal of the RF switch in the first state. The RF switch is also configured for coupling the input terminal to the second output terminal of the RF switch in the second state. The second output terminal of the RF switch is coupled to a receiver input circuit, such as a low noise amplifier.

According to another aspect of the invention, the system is comprised of an RF detector circuit for detecting a presence of an RF signal at the resistive termination. In this regard, it should be appreciated that the control circuit is configured for maintaining the input terminal of a second RF switch coupled to a second resistive termination when the RF detector circuit detects a predetermined level of RF energy.

According to yet another aspect, the invention concerns a method for lossless transmit path antenna switching in a transceiver. The method includes several steps. In a transmit configuration, the method includes amplifying a first RF signal in a first RF power amplifier circuit and a second RF signal in a second power amplifier circuit. An output of the first and second RF power amplifier circuits is coupled to a first and second input port of a quadrature hybrid power combiner to generate an RF output signal which is the sum of the first and second RF signals. Thereafter, the RF output signal from an output port of the quadrature hybrid power combiner is coupled to an antenna exclusive of any intervening antenna switch.

The method also includes providing a low loss path for RF signals from the antenna to an isolated port of the hybrid power combiner. The low loss path is provided by causing an impedance mismatch at the first and second input port of the hybrid power combiner. In an embodiment of the invention, the impedance mismatch is caused at the first and second input port by removing or at least modifying a bias voltage for the first and second RF power amplifier circuit. The method also includes coupling the isolated port to an RF switch having an input terminal, and selectively coupling the input terminal to a receiver circuit concurrently with providing a low loss path for RF signals form the antenna to the isolated port.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Embodiments of the present invention will now be described with respect to FIG. 2 through FIG. 4. Some embodiments of the present invention provide a transceiver circuit that suffers from less power loss than a conventional transceiver circuit, generates less heat than a conventional transceiver circuit, and is more efficient than a conventional transceiver circuit.

Figure 2:
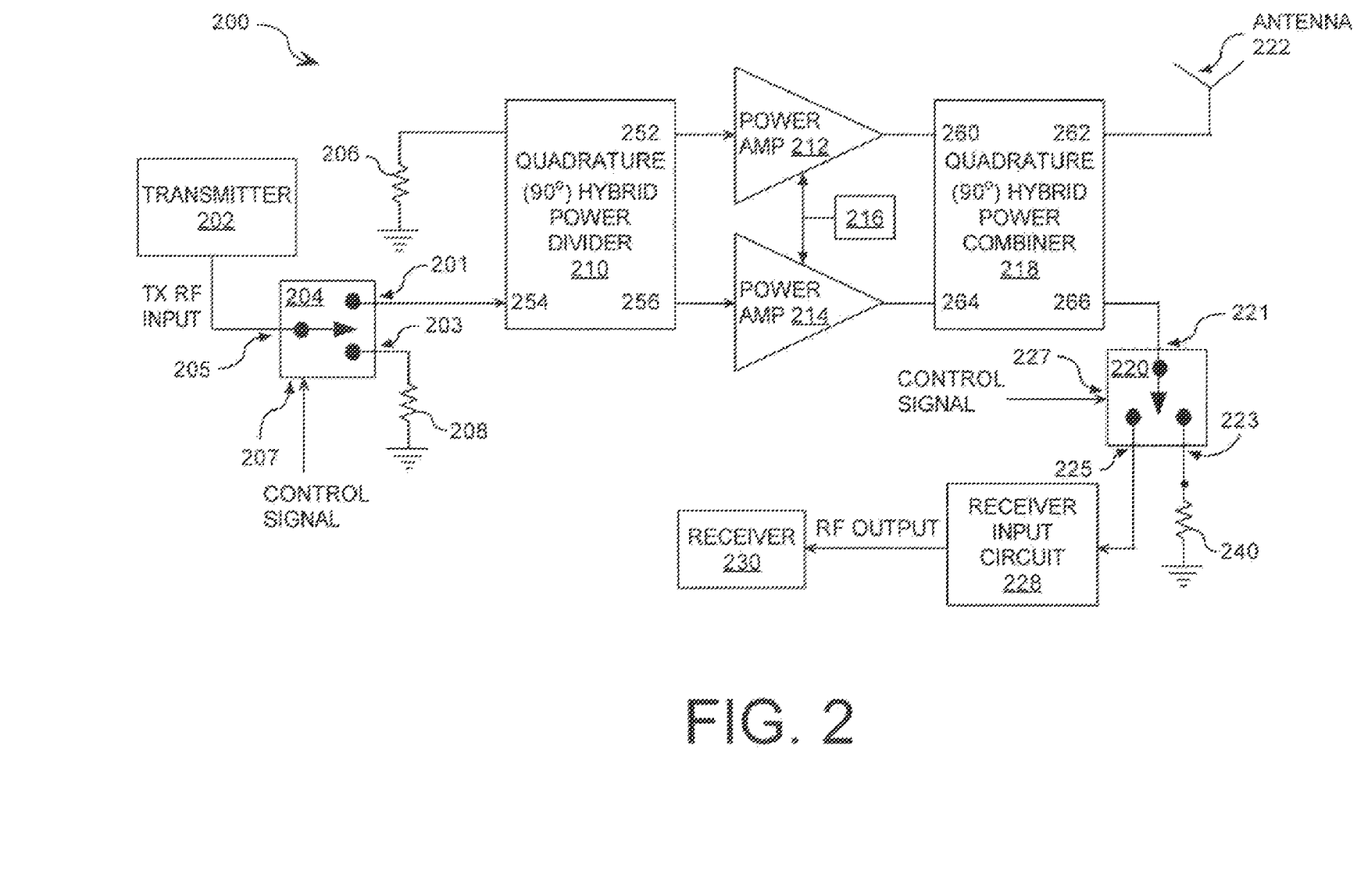
FIG. 2 is a block diagram of a transceiver circuit that is useful for understanding the invention.

Referring now to FIG. 2, a transceiver circuit 200 is shown that is useful for understanding the invention. As may be observed in FIG. 2, the circuit 200 is comprised of a transmitter 202, an RF switch 204, resistive terminations 206, 208, a quadrature (90°) hybrid power divider 210, a quadrature (90°) hybrid power combiner 218, RF power amplifier circuits 212, 214, a controller 216, and an antenna 222. The transceiver circuit 200 is also comprised of an RF switch 220, a receiver input circuit 228, a receiver 230, and a resistive termination 240. Each of the listed components are well known to persons skilled in the art. Thus, these components will not be described in great detail herein.

The operation of the transceiver circuit 200 will now be described in detail to assist a reader in understanding the present invention. In a first state, power is supplied to the transmitter 202 which is configured to communicate radio frequency (RF) energy to an external device (such as the quadrature (90°) hybrid power divider 210). In this regard, it should be understood that the transmitter 202 is typically comprised of an oscillator, a modulator, and at least one amplifier for radio frequency.

Also in this first state, a control signal is received at a control terminal 207 of the RF switch 204. Consequently, an input terminal 205 of the RF switch 204 is coupled to an output terminal 201 of the RF switch 204. In effect, the transmitter 202 is connected to an input port 254 of the quadrature (90°) hybrid power divider 210. As such, the transmitter 202 can communicate RF energy to the quadrature (90°) hybrid power divider 210.

Upon receipt of RF energy, the quadrature (90°) hybrid power divider 210 performs actions to equally divide RF power received at the input port 254 and provide two equal power RF output signals that are ninety degrees (90°) out of phase at output ports 252, 256. After generating these two equal power RF output signals, the quadrature (90°) hybrid power divider 210 communicates a first equal power RF output signal to the RF power amplifier circuit 212 and a second equal power RF output signal to the RF power amplifier circuit 214.

The controller 216 communicates a control signal to each RF power amplifier circuit 212, 214. Consequently, the RF power amplifier circuits 212, 214 are transitioned into their first state. In this first state, the RF power amplifier circuits 212, 214 are properly biased for producing RF gain and a high RF power output. The RF power amplifier circuits 212, 214 are also properly biased for providing an output impedance that is substantially matched to input ports 260, 264 of the quadrature (90°) hybrid power combiner 218. In this regard, it should be appreciated that the RF power amplifier circuits 212, 214 are comprised of semiconductor transistors. As will be understood by a person skilled in the art, semiconductor transistors are sensitive to direct current (DC) bias voltages and currents applied thereto. As such, an output impedance of an RF power amplifier circuit 212, 214 can be selectively transitioned between a low output impedance and a high output impedance simply by varying the DC bias voltage and current applied thereto.

According to one embodiment, the controller 216 communicates a first control signal to each power amplifier circuit 212, 214 in the first state. The first control signal can be an actual bias voltage supplied to the RF power transistors. Alternatively, the first control signal can indirectly be used to control the bias voltage applied to the RF power transistors. For example, the control signal can control a voltage regulating device or circuit which provides a bias voltage to the RF power amplifier circuits 212, 214.

Regardless of the details of the implementation, the first control signal is selected so that when such signal is communicated to the RF power amplified circuits 212, 214 the RF power transistors are turned "on." In effect, the output impedances of the RF power amplifier circuits 212, 214 are transitioned from a high output impedance which is substantially mismatched to an input port 260 impedance, to an output impedance which is more closely matched to or approximates the input impedance of input port 260.

In the second state, the controller 216 communicates a second control signal to each power amplifier circuit 212, 214. Like the first control signal, the second control signal can be an actual bias voltage supplied to the RF power transistors in the RF power amplifier circuits 212, 214. However, the second control signal can also be arranged to indirectly control such bias voltage. For example, the control signal can control a voltage regulation circuit which provides a bias voltage to the RF power amplifier circuits 212, 214.

Regardless of the details of the implementation, the second control signal is selected so that when such signal is communicated to the RF power amplifier circuits 212, 214 the RF power transistors are turned "off." In effect, the output impedances of the RF power amplifier circuits 212, 214 are transitioned from a low output impedance which is approximately equal to the input port 260 impedance, to a high output impedance which is highly mismatched to the impedance of the input port 260. Transistor bias voltage control circuits and other techniques for controlling the output impedance of a RF power amplifier circuit 212, 214 as described herein as well known in the art. In this regard, it should be understood that the invention is not limited to the particular techniques described herein for selectively controlling an output impedance of RF power amplifier circuits 212, 214. Instead, any suitable arrangement can be used. For example, rather than controlling the output impedance of the RF power amplifier circuits 212, 214 by selectively varying the DC bias voltage applied to the RF power transistors, a variable output impedance transformer circuit could be used. The output impedance transformer could selectively vary the output impedance of the RF power amplifier circuits 212, 214 as necessary to achieve the same effect. Variable impedance transformers are well known in the art. Accordingly, these control features.

Upon receipt of the first and second RF signals communicated from the quadrature (90°) hybrid power divider 210, each RF power amplifier circuit 212, 214 performs actions to amplify an RF power of a received RF signal. Thereafter, the RF power amplifier circuits 212, 214 communicate the amplified RF signals to the input ports 260, 264 of the quadrature (90°) hybrid power combiner 218. The quadrature (90°) hybrid power combiner 218 performs actions to phase shift one of the amplified RF signals by 90° so that the two amplified signals are in phase. The two amplified signals are then combined together to form a single output RF signal. Subsequently, the quadrature (90°) hybrid power combiner 218 communicates the output RF signal to the antenna 222 for transmission to an external device (not shown). It should be appreciated that the output RF signal communicated from the quadrature (90°) hybrid power combiner 218 to the antenna 222 experiences only a minimal loss of RF power. This minimal power loss is achieved by eliminating an antenna switch 114 (shown in FIG. 1) between an output port 262 of the quadrature (90°) hybrid power combiner 218 and the antenna 222.

Also in this first state, a control signal is received at a control terminal 227 of the RF switch 220. Consequently, an input terminal 221 of the RF switch 220 is coupled to an output terminal 223 of the RF switch 220. In effect, RF energy can be coupled from the quadrature (90°) hybrid power combiner 218 to the resistive termination 240 (for example, fifty ohm (50Ω) resistor). Any reflections of RF energy due to an impedance mismatch between the RF power amplifier circuits 212, 214 and/or an antenna voltage standing wave ratio (VSWR) are communicated to the isolated port 266. Such reflected RF energy is directed through switch 220 to the resistive termination 240 where the reflected power is absorbed.

In a second state, the transceiver circuit 200 is configured for receiving an RF signal from antenna 222 and communicating that signal to the receiver input circuit 228. In the second state, a control signal is received at the control terminal 207 of the RF switch 204. Consequently, the input terminal 205 of the RF switch 204 is coupled to an output terminal 203 of the RF switch 204. In effect, the transmitter 202 is connected to a resistive termination 208. As such, any RF energy from transmitter 202 can be coupled from the transmitter 202 to ground through the resistive termination 208.

In the second state, a bias voltage for each RF power amplifier circuit 212, 214 is either modified or removed entirely. In effect, the RF power amplifier circuits 212, 214 are transitioned into their second state by changing their bias voltage. In this second state, the RF power amplifier circuits 212, 214 are properly biased for providing an output impedance that is substantially mismatched to input ports 260, 264 of the quadrature (90°) hybrid power combiner 218. In this regard, it should be appreciated that an output impedance of each RF power amplifier circuit 212, 214 is selectively variable between the first state and the second state. In this regard, it should be appreciated that varying the bias voltage of the RF amplifier circuits 212, 214 is one possible method of varying the output impedance of these circuits. Other methods are also possible. For example, an output matching circuit for the RF amplifier circuits 212, 214 can be provided that selectively controls the output impedance other RF amplifier circuits as seen by the quadrature (90°) hybrid power combiner input ports 260, 264. In general, an impedance mismatch at the input ports 260, 264 of the quadrature (90°) hybrid power combiner 218 causes power from the antenna 222 to be directed to an isolated port 266 of the quadrature (90°) hybrid power combiner 218 with a low RF power loss. Accordingly, by providing a substantial impedance mismatch at the input ports 260, 264, a low loss path can be provided from antenna 222 to the isolated port 266.

In this regard, it should be appreciated that an open circuit at the input ports 260, 264 or a short at the input ports 260, 264 results in the provision of the low loss path from the antenna 222 to the isolated port 266. Such scenarios occur when the RF amplifier circuits 212, 214 are in the second state. In this state, an insertion loss of a transmit path is essentially that of an insertion loss of the quadrature (90°) hybrid power combiner 218. An expected range of insertion loss values is presented in the following table. As should be appreciated, an insertion loss value is a function of an input impedance value of the input ports 260, 264.

| INPUT IMPEDANCE AT INPUT PORTS 260, 264 IN OHMS (Ω) | VOLTAGE STANDING WAVE RATIO AT INPUT PORTS 260, 264 | INSERTION LOSS FROM ANTENNA 222 TO ISOLATED PORT 266 IN DECIBELS (dB) |
| --- | --- | --- |
| open or short | infinity:1 | −0.2 dB |
| 1.5 Ω or 1600 Ω | 32:1 | −0.5 dB |
| 3.0 Ω or 800 Ω | 16:1 | −1.1 dB |
| 6.25 Ω or 400 Ω | 8:1 | −2.4 dB |
| 12.5 Ω or 200 Ω | 4:1 | −4.5 dB |

In the second state, a control signal is received at the control terminal 227 of the RF switch 220 thereby causing RF switch 220 to form a low loss RF path between the input terminal 221 and an output terminal 225. As such, RF energy is coupled from the isolated port 266 of the quadrature (90°) hybrid power combiner 218 to the receiver input circuit 228. According to one embodiment of the invention, the receiver input circuit 228 is configured to amplify RF power. After amplifying RF power, the receiver input circuit 228 communicates an amplified RF signal to the receiver 230.

According to an embodiment of the invention, the receiver input circuit 228 is advantageously comprised of a low noise amplifier. The low noise amplifier can amplify the RF power while only adding a small amount of noise to a RF signal. Still, the invention is not limited in this regard. The receiver input circuit 228 can be comprised of any circuit or device that is suitable for a particular transceiver circuit 200 application. For example, the receiver input circuit can include a band pass filter, diplexer circuit or any other signal processing circuit as needed. Also, it should be understood that the receiver input circuit 228 can be incorporated within the receiver 230 without limitation.

It should be appreciated that the RF switches 204, 220 are advantageously selected as low power PIN or MMIC switches. However, the invention is not limited in this regard. The RF switches 204, 220 can be selected as any RF switch known in the art, provided that it is suitable for a particular transceiver circuit 200 application and requires a relatively low amount of power to operate.

It should also be appreciated that the transceiver circuit 200 has advantages over the conventional transceiver circuit 100 shown in FIG. 1. For example, the architecture of the transceiver circuit 200 negates the need for a high power PIN diode switch between the antenna 222 and the quadrature (90°) hybrid power combiner 218. As such, the transceiver circuit 200 is absent of a high voltage power supply requirement for driving a high power PIN diode switch. In effect, a DC power source (not shown) can supply less power to the transceiver circuit 200 thereby increasing the circuits overall efficiency and reducing the amount of heat generated by the circuit.

It should further be appreciated that a control circuit can be implemented into the transceiver circuit 200 for controlling the RF switches 204, 220. This control circuit can also provide a means for protecting the RF power amplifier circuits 212, 214 from damage due to an impedance mismatch between the RF power amplifier circuits 212, 214 and/or an antenna voltage standing wave ratio (VSWR). This protection of the RF power amplifier circuits 212, 214 can be accomplished by monitoring the magnitude of any transmit power delivered to the resistive termination 240. A transceiver circuit having such a control circuit implemented therein is described in greater detail below in relation to FIG. 3. It should be understood that the control circuit shown in FIG. 3 is merely one possible implementation of a control circuit for the present invention. Accordingly, the invention is not limited in this regard.

Figure 3:
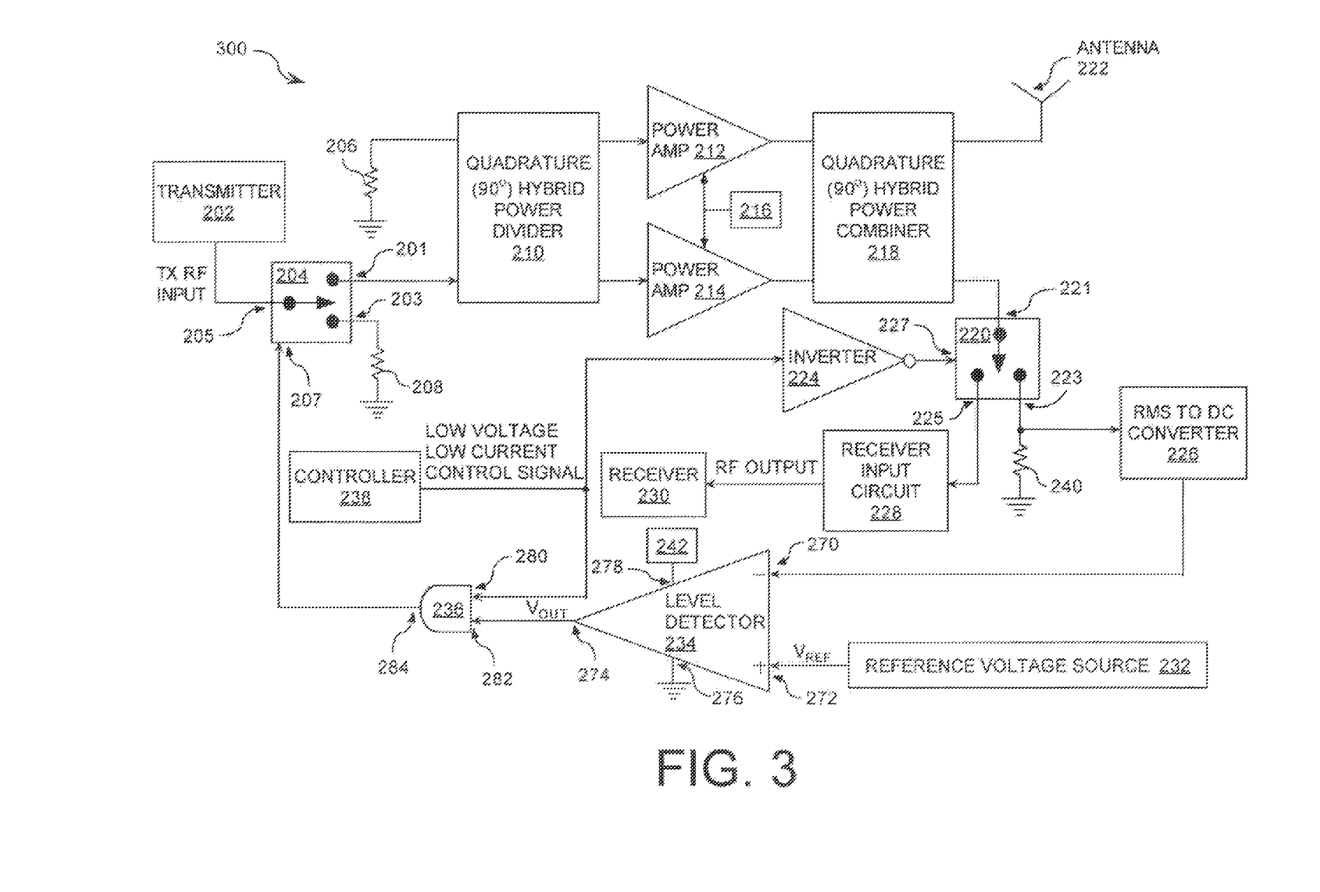
FIG. 3 is a block diagram of a transceiver circuit having a control circuit that is useful for understanding the invention.

Referring now to FIG. 3, there is provided a transceiver circuit 300 that is useful for understanding the invention. As shown in FIG. 3, the transceiver circuit 300 is comprised of the transmitter 202, the RF switch 204, the resistive terminations 206, 208, the quadrature (90°) hybrid power divider 210, the quadrature (90°) hybrid power combiner 218, the RF power amplifier circuits 212, 214, the controller 216, and the antenna 222. The transceiver circuit 200 is also comprised of the RF switch 220, the receiver input circuit 228, the receiver 230, and the resistive termination 240. The description above (in relation to FIG. 2) will suffice with respect to these listed components.

Referring again to FIG. 3, the transceiver circuit 300 is comprised of a control circuit for controlling the RF switch 220 and for controlling a the RF switch 204. As shown in FIG. 1, the control circuit is comprised of a controller 238 and an inverter 224, RMS-to-DC converter 226, a level detector circuit 234, a reference voltage source 232, and an AND Gate 236.

The controller 238 is comprised of a circuit configured to communicate a low voltage, low current control signal to the inverter 224. The inverter 224 is comprised of a circuit configured to invert a received signal from the control circuit 238 and to communicate an inverted signal to the control terminal 227 of the RF switch 220.

The RF switch 220 is configured for selectively coupling the input terminal 221 to either the output terminal 223 or the output terminal 225. For example, the RF switch 220 is responsive to the low voltage, low current control signal such that the input terminal 221 is coupled to the output terminal 22 when the RF power amplifier circuits 212, 214 are in their first states. The RF switch 220 is also responsive to the low voltage, low current control signal such that the input terminal 221 is coupled to the output terminal 225 when the RF power amplifier circuits 212, 214 are in their second states.

An RF detector circuit is provided for detecting the presence of RF energy at the resistive termination 240. This RF detector circuit is comprised of the RMS-to-DC converter 226 and the level detector circuit 234. The RMS-to-DC converter 226 is comprised of a circuit configured to convert RF energy to a variable DC voltage output. The RMS-to-DC converter 226 is also comprised of a circuit configured to communicate the variable DC voltage value to the level detector circuit 234.

The level detector circuit 234 is preferably a comparator circuit (for example, an open loop polarity indicator). Still, the invention is not limited in this regard. The level detector circuit 234 can be comprised of any circuit known in the art, provided that it has suitable specifications for a particular transceiver circuit 300 application.

Referring again to FIG. 3, the level detector circuit 234 is comprised of an inverting input terminal 270, a non-inverting input terminal 272, a V+ terminal 278, a V− terminal 276, and an output terminal 274. The inverting input terminal 270 is electrically coupled to the RMS-to-DC converter 226. The non-inverting input terminal 272 is electrically coupled to a reference voltage source 232. The reference voltage source 232 is configured to supply a reference voltage ($V_{REF}$) to the level detector circuit 234.

As shown in FIG. 3, the V+ terminal 278 is coupled to a power supply 242 and the V− terminal 276 is coupled to ground. As such, an input power supply voltage is coupled directly across the V+ terminal 278 and the V− terminal 276 of the level detector circuit 234. The level detector circuit 234 output voltage ($V_{OUT}$) is forced to either the level detector circuit's positive saturation level or negative saturation level For example, if a voltage at the non-inverting input terminal 272 is more positive than a voltage of the inverting input terminal 270, the $V_{OUT}$ is forced to the level detector circuit's positive saturation level (i.e. the value of the input power supply voltage). Alternatively, if a voltage at terminal 272 is less positive than a voltage at terminal 270, the $V_{OUT}$ is forced to the level detector circuit's negative saturation (i.e., zero volts).

The output terminal 274 of the level detector circuit 234 is electrically coupled to the AND Gate 236. The AND Gate 236 is comprised of input terminal 280, 282 and an output terminal 284. The input terminal 280 is electrically coupled to the controller 238 which is configured to communicate a low voltage, low current control signal to the AND Gate 236. Similarly, the input terminal 282 is electrically coupled to the output 274 of the level detector circuit 234.

The AND Gate 236 is comprised of a circuit configured to generate an output signal having a high or a low voltage value. For example, if both voltages at the input terminals 280, 282 are a high value (for example, one volt), then the output signal of the AND Gate 236 has a high voltage value (for example, five volts). If neither or only one of the voltages at the input terminals 280, 282 are of a high value, then the output signal of the AND Gate 236 has a low voltage value (for example, zero volts). The AND Gate 236 is further configured to communicate the output signal to the control terminal 207 of the RF switch 204.

The RF switch 204 is configured for selectively coupling the input terminal 205 to either the output terminal 201 or the output terminal 203. For example, the RF switch 204 is responsive to the output signal from the AND Gate 236 such that the input terminal 205 is coupled to the output terminal 201 when the RF power amplifier circuits 212, 214 are in their first states. The RF switch 204 is also responsive to the output signal from the AND Gate 236 such that the input terminal 205 is coupled to the output terminal 203 when the RF power amplifier circuits 212, 214 are in their second states.

It should be appreciated that the level detector circuit 234 and the RMS-to-DC converter 226 provide a means to monitor the magnitude of any transmit power delivered to the resistive termination 240 due to an impedance mismatch between the RF power amplifier circuits 212, 214 and/or an antenna relative to one or more ports of the quadrature hybrid power combiner. For example, in the event of an excessive magnitude (for example, greater than twenty percent) of reflected transmit power delivered to the resistive termination 240, an RF path between the input terminal 221 of the RF switch 220 and the output terminal 225 of the RF switch is eliminated and the input terminal 221 of the RF switch 2221 is instead coupled to the output terminal 223 of the RF switch 221. As such, high power RF energy from the RF power amplifier circuits 212, 214 is prevented from being communicated to the receiver input circuit 228, which is easily damaged by such signals.

Figure 4:
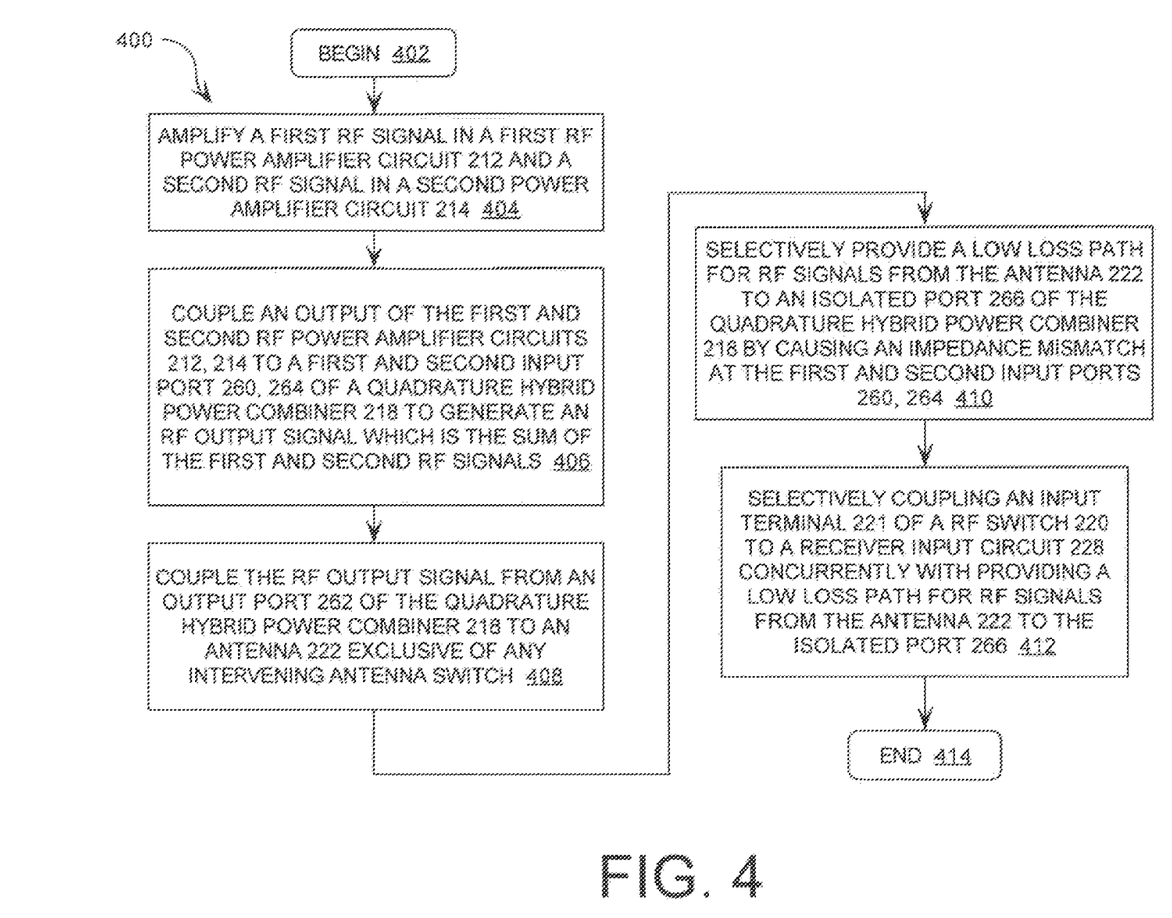
FIG. 4 is a flow diagram of a method for lossless transmit path antenna switching in a transceiver.

Referring now to FIG. 4, there is provided a flow diagram of a method 400 for lossless transmit path antenna switching in a transceiver. The method 400 begins at step 402 and continues with step 404. In step 404, a first RF signal is a first RF power amplifier circuit 212 and a second RF signal in a second power amplifier circuit 214 are amplified. Thereafter, step 406 is performed where an output of the first and second RF power amplifier circuits 212, 214 are respectively coupled to a first and second input ports 260, 264 of a quadrature (90°) hybrid power combiner 218 to generate an RF output signal which is the sum of the first and second RF signals. After step 406, the method 400 continues with step 408. In step 408, the RF output signal from an output ports 262 of the quadrature (90°) hybrid power combiner 218 is coupled to an antenna 222 that is exclusive of any intervening antenna switch.

In step 410, a low loss path for RF signals from the antenna 222 to an isolated ports 266 of the quadrature (90°) hybrid power combiner 281 is selectively provided by causing an impedance mismatch at the first and second input ports 260, 264 of the quadrature (90°) hybrid power combiner 218. In step 412, an input terminal 221 of an RF switch 220 is selectively coupled to a receiver input circuit 228. Concurrently, a low loss path for RF signals is provided from the antenna 222 to the isolated port 266 of the quadrature (90°) hybrid power combiner 218. After step 412, step 414 is performed where the method 400 ends.

A person skilled in the art will appreciate that the method 400 is one embodiment of a method for lossless transmit path antenna switching in a transceiver. However, the invention is not limited in this regard and any other method for lossless transmit path antenna switching in a transceiver can be used without limitation.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

I claim:

1. A system for lossless transmit path antenna switching in a transceiver using quadrature combined power amplifiers, comprising:
a quadrature hybrid power combiner having a first input port, a second input port, an isolated port, and an output port;
a first RF power amplifier circuit and a second RF power amplifier circuit respectively coupled to said first input port and said second input port, said first and second RF power amplifier circuit each having an output impedance that is selectively variable between a first state and a second state; and
wherein said quadrature hybrid power combiner communicates RF energy from said first and second input port to said output port when said first and second RF power amplifier circuits are each in said first state, and communicates RF energy from said output port to said isolated port when said first and second RF amplifier power circuits are in said second state.

2. The system according to claim 1, wherein said output impedance of said first and second RF power amplifier circuits are substantially matched to said first and second input ports in said first state, and substantially mismatched to said first and second input ports in said second state.

3. The system according to claim 1, further comprising a control circuit coupled to said first and second RF power amplifier circuits for selectively transitioning said first and second RF power amplifier circuits between said first state and said second state responsive to a control signal.

4. The system according to claim 1, further comprising an RF switch having an input terminal coupled to said isolated port, said RF switch configured for selectively coupling said input terminal to either a first output terminal of said RF switch or a second output terminal of said RF switch.

5. The system according to claim 4, further comprising a resistive termination connected to said first output terminal of said RF switch.

6. The system according to claim 5, further comprising a control circuit coupled to said first and second RF power amplifier circuits for selectively transitioning said first and second RF power amplifier circuits between said first state and said second state responsive to a control signal.

7. The system according to claim 6, wherein said RF switch is responsive to said control circuit, and is configured for coupling said input terminal to said first output terminal of said RF switch in said first state, and for coupling said input terminal to said second output terminal of said RF switch in said second state.

8. The system according to claim 4, wherein said second output terminal of said RF switch is coupled to a receiver input circuit.

9. The system according to claim 8, wherein said receiver input circuit is a low noise amplifier.

10. The system according to claim 7, further comprising an RF detector circuit for detecting a presence of an RF signal at said resistive termination.

11. The system of claim 10, wherein said control circuit is configured for maintaining an input terminal of a second RF switch coupled to a second resistive termination when said RF detector circuit detects a predetermined level of RF energy.

12. The system according to claim 1, further comprising a quadrature hybrid power divider having a first output port, a second output port, an input port, and an isolated port, said first and second RF power amplifier circuits respectively coupled to said first and second output ports.

13. The system according to claim 12, further comprising an RF switch configured for switching RF energy from an input terminal coupled to a transmitter to either a first or second output terminal.

14. The system according to claim 13, wherein said first output terminal is coupled to said quadrature hybrid power divider.

15. The system according to claim 14, wherein said second output terminal is coupled to a resistive termination.

16. A system for lossless transmit path antenna switching in a transceiver using quadrature combined power amplifiers, comprising:
  a quadrature hybrid power combiner having a first input port, a second input port, an isolated port, and an output port, said output port coupled to an antenna;
  a first RF power amplifier circuit and a second RF power amplifier circuit respectively coupled to said first input port and said second input port, an output impedance of said first and second RF power amplifier circuits substantially matched to said first and second input ports in a first state, and substantially mismatched to said first and second input ports in a second state;
  a control circuit coupled to said first and second RF power amplifier circuits for selectively transitioning said first and second RF power amplifier circuits between said first state and said second state responsive to a control signal; and
  wherein said quadrature hybrid power combiner communicates RF energy from said first and second input ports to said output port when said first and second RF power amplifier circuits are each in said first state, and communicates RF energy from said output port to said isolated port when said first and second RF amplifier power circuits are in said second state.

17. A system for lossless transmit path antenna switching in a transceiver using quadrature combined power amplifiers, comprising:
  a quadrature hybrid power combiner having a first input port, a second input port, an isolated port, and an output port, said output port coupled to an antenna;
  a first RF power amplifier circuit and a second RF power amplifier circuit respectively coupled to said first input port and said second input port, an output impedance of said first and second RF power amplifier circuits substantially matched to said first and second input ports in a first state, and substantially mismatched to said first and second input ports in a second state;
  an RF switch having an input terminal coupled to said isolated port, said RF switch configured for selectively coupling said input terminal to either a first output terminal of said RF switch or a second output terminal of said RF switch;
  a resistive termination connected to said first output terminal of said RF switch;
  a control circuit coupled to said first and second RF power amplifier circuits for selectively transitioning said first and second RF power amplifier circuits between said first state and said second state responsive to a control signal; and
  wherein said quadrature hybrid power combiner communicates RF energy from said first and second input ports to said output port when said first and second RF power amplifier circuits are each in said first state, and communicates RF energy from said output port to said isolated port when said first and second RF amplifier power circuits are in said second state.

18. The system according to claim 17, wherein said RF switch is responsive to said control circuit for coupling said input terminal to said first output terminal of said RF switch in said first state, and for coupling said input terminal to said second output terminal of said RF switch in said second state.

19. The system according to claim 18, wherein said second output terminal of said RF switch is coupled to a receiver input circuit.

20. The system according to claim 19, wherein said receiver input circuit is a low noise amplifier.

21. A method for lossless transmit path antenna switching in a transceiver, comprising:
  amplifying a first RF signal in a first RF power amplifier circuit and a second RF signal in a second power amplifier circuit;
  respectively coupling an output of said first and second RF power amplifier circuits to a first and second input port of a quadrature hybrid power combiner to generate an RF output signal which is the sum of the first and second RF signals;
  coupling said RF output signal from an output port of said quadrature hybrid power combiner to an antenna exclusive of any intervening antenna switch; and
  selectively providing a low loss path for RF signals from said antenna to an isolated port of said hybrid power combiner by causing an impedance mismatch at said first and second input port.

22. The method according to claim 21, further comprising causing said impedance mismatch at said first and second input port by removing a bias voltage from said first and second RF power amplifier circuit.

23. The method according to claim 22, further comprising coupling said isolated port to an RF switch having an input terminal, and selectively coupling said input terminal to a receiver circuit concurrently with providing a low loss path for RF signals from said antenna to said isolated port.

* * * * *